(12) United States Patent
Schoenmakers et al.

(10) Patent No.: US 10,467,512 B2
(45) Date of Patent: Nov. 5, 2019

(54) METHOD OF USING AN INTERFACE DEVICE AND INTERFACE DEVICE

(71) Applicant: OCE-TECHNOLOGIES B.V., Venlo (NL)

(72) Inventors: Erik J. W. Schoenmakers, Venlo (NL); Rob J. E. Looijmans, Venlo (NL)

(73) Assignee: OCE-TECHNOLOGIES B.V., Venlo (NL)

( * ) Notice: Subject to any disclaimer, the term of this patent is extended or adjusted under 35 U.S.C. 154(b) by 491 days.

(21) Appl. No.: 15/274,759

(22) Filed: Sep. 23, 2016

(65) Prior Publication Data

US 2017/0091602 A1    Mar. 30, 2017

(30) Foreign Application Priority Data

Sep. 25, 2015    (EP) .................................... 15186891

(51) Int. Cl.
| | |
|---|---|
| *G06K 15/00* | (2006.01) |
| *G03G 15/00* | (2006.01) |
| *H04N 1/00* | (2006.01) |
| *H04N 1/32* | (2006.01) |

(52) U.S. Cl.
CPC ..... *G06K 15/4045* (2013.01); *G06K 15/4025* (2013.01); *H04N 1/0083* (2013.01); *H04N 1/32603* (2013.01)

(58) Field of Classification Search
CPC ................................................ H04N 1/00655
See application file for complete search history.

(56) References Cited

U.S. PATENT DOCUMENTS

| | | | | |
|---|---|---|---|---|
| 5,592,881 | A * | 1/1997 | Rabjohns | G06F 11/006 101/483 |
| 5,600,354 | A * | 2/1997 | Hackleman | B41J 2/14024 347/50 |
| 5,629,775 | A * | 5/1997 | Platteter | G06F 3/1204 358/296 |
| 6,290,406 | B1 * | 9/2001 | Gauthier | B41J 3/54 400/61 |
| 8,233,175 | B2 | 7/2012 | Richards et al. | |

(Continued)

FOREIGN PATENT DOCUMENTS

EP            1755006 A1    2/2007

*Primary Examiner* — Shelby L Fidler
(74) *Attorney, Agent, or Firm* — Birch, Stewart, Kolasch & Birch, LLP

(57) ABSTRACT

A method of using an interface device to interface to a processing unit is disclosed. The interface device and the processing unit are part of a station of a plurality of stations in a sheet processing line. The method involves using the interface device to receive a control signal from an upstream station, and comparing a selection part of the control signal with a reference, the selection part being part of an addressing part of the control signal. If the comparison result is negative, a further control signal is determined from the control signal, which is derived from and differing from the addressing part of the control signal and the interface device outputs the further control signal to a different interface device corresponding to a processing unit of a downstream station. If the comparison result is positive, an instruction signal is sent from the interface device to the processing unit.

8 Claims, 4 Drawing Sheets

(56) References Cited

U.S. PATENT DOCUMENTS

2004/0215706 A1* 10/2004 Lavender ............... G06F 8/65
                                                    709/201
2012/0140271 A1*  6/2012 Yasukaga ........... H04N 1/00278
                                                    358/1.15

* cited by examiner

METHOD OF USING AN INTERFACE DEVICE AND INTERFACE DEVICE

CROSS-REFERENCE TO RELATED APPLICATIONS

This application claims priority under 35 U.S.C. § 119(a) to application Ser. No. 15/186,891.6, filed in Europe on Sep. 25, 2015, the entire contents of which is hereby incorporated by reference into the present application.

BACKGROUND OF THE PRESENT INVENTION

1. Field of the Invention

The present invention relates to a method of using an interface device to interface to a processing unit, the interface device and the processing unit is comprised in a station of a plurality of stations in a sheet processing line, the method comprising using the interface device to receive a control signal from an upstream station.

The present invention also relates to an interface device for interfacing to a processing unit, wherein the interface device and the processing unit are arranged to be comprised in a station of a plurality of stations in a sheet processing line, and wherein the interface device is arranged to receive a control signal from an upstream station.

A parallel bus referred to as DFD bus, according to the 2.0 spec, is known to communicate between an imaging device and a finisher, which are placed adjacent one another to form a sheet processing line. The imaging device and the finisher each form a station in the sheet processing line. The finisher comprises a processing unit and an interface device. The interface device interfaces between the parallel bus and the processing unit. The imaging device comprises a print engine and an interface device interfacing between the parallel bus and the print engine.

The parallel bus is a 37 pin bus, comprising 3 ground pins, 8 signal pins and 8 complementary signal return pins, 8 command pins and 8 complementary command return pins, and finally 2 undefined pins.

The DFD bus version 2.0 (herein DFD2-bus) is designed to couple a finisher directly to a print engine.

It is however desired to facilitate that more than one finisher can be attached to the print engine. This is because a finisher may have a lower throughput rating than the print engine. Operating a sheet processing line with 2 finishers capable of the same finishing operations obviously increases the finishing throughput rating so that the throughput rating of the print engine can be matched or even surpassed.

To ensure flexibility, finishers and print engines in professional print environments are designed to mechanical and electrical specifications, so that in use, they can be physically placed in the sheet processing line, and then coupled and decoupled with little effort. Simplicity in coupling is desired as the operators in professional print environments may have different skill levels. In case more than one finisher is used in the sheet processing line, a finisher has to be selected to perform the finishing operation, which means that adding a finisher requires that some kind of addressing is arranged. In addition, depending on the case, a sheet processing line may be operated with a single finisher as well, and the method of interfacing should be able to be compatible with both situations.

SUMMARY OF THE INVENTION

It is an object of the present invention to provide a method of interfacing to a processing unit that provides for simple coupling and decoupling of a station in a sheet processing line.

The object of the present invention is achieved in an embodiment of the present invention providing a method of using an interface device to interface to a processing unit. The interface device and the processing unit are comprised in a station of a plurality of stations in a sheet processing line, the method comprises using the interface device to receive a control signal from an upstream station, determining a comparison result by comparing a selection part of the control signal with a reference, wherein the selection part is comprised in an addressing part of the control signal. When the comparison result is negative, the method further comprises determining a further control signal from the control signal, at least a further addressing part of the further control signal is derived from and differing from the addressing part of the control signal and using the interface device to output the further control signal to a further interface device corresponding to a further processing unit of a downstream station. When the comparison result is positive, the method further comprises sending an instruction signal from the interface device to the processing unit.

This method allows for a coupling without the need for changing or checking settings on a station, in case of coupling or decoupling, where the station comprises a processing unit in the sheet processing line.

By sending an instruction signal to the processing unit, in the instance of a positive comparison result, the processing unit is informed on the positive comparison result. Thus, the processing unit can be instructed via the interface device, which allows the processing unit to react in different ways corresponding to the presence, absence, and content of an instruction signal.

For instance, in case of the presence of an instruction signal (a positive comparison result), the processing unit may finish a sheet and direct the sheet to an output of the sheet processing line without passing the sheet on to the further station. Alternatively, in case of the absence of an instruction signal (a negative comparison result), the processing unit may function in a feed-through mode and pass on the sheet to the further station.

In the situation where the comparison result is negative and the further processing unit receives the further control signal, the further interface device can be a copy of the interface device, and still perform a different comparison. The different comparison may have either a positive result or a negative result, and may signal to the further processing unit in the same way as the interface device to arrange that the further processing unit is instructed. This does not depend on a difference between the reference of the interface device and the reference of the further interface device.

As this does not depend on a difference in the references of the interface device and the further interface device, nothing has to be checked or changed both on the interface device and on the further interface device. Instead, the further addressing part is derived from and different from the addressing part, such that the reference can be the same in the interface device and the further interface device. Therefore, the process of coupling or decoupling is simple, and not prone to errors when using interface devices arranged for this method in all the stations in the sheet processing line.

In a further embodiment, the instruction signal is based on an instruction part of the control signal. In yet a further embodiment, the instruction signal is copied from the instruction part of the control signal.

In a further embodiment, a comparator is used for determining of a comparison result, where the determining is performed by a signal processing apparatus.

In a further embodiment, a determination circuit connected to the comparator is used for determining a further control signal from the control signal.

In a further embodiment, a sending circuit connected to an output port and to the comparator is used for sending the instruction signal.

According to a further embodiment of the method, the method in case of a positive comparison result comprises sending an instruction signal from the interface device to the processing unit. The instruction signal is formed by an instruction part of the control signal, the instruction part of the control signal and the addressing part of the control signal is received over separate connections, and determining a further control signal. The step of determining a further control signal comprises producing a further addressing part of the further control signal that differs from the addressing part of the control signal, and producing a further instruction part of the further control signal based on the instruction part of the control signal, wherein that the further instruction part and the further addressing part of the further control signal are outputted over separate connections.

As the addressing part of the control signal comprises the selection part, the instruction part and the addressing part of the control signal is received over separate connections logically, which means that the selection part and the instruction part are also received over separate connections.

In addition, the further instruction part is output separate from the further addressing part.

Moreover, the selection part of the control signal is used for comparing with the reference, and the instruction part is received over connections that are separate from the selection part.

The combination of these elements allows the interface device to have a comparatively simple physical construction. This is because the instruction part of the control signal can be used directly to form the instruction signal without any computation, other processing, and without involving the selection part.

According to a further embodiment of the method, the control signal is received over a digital parallel bus comprising a plurality of parallel connections between the upstream station and the station, the further control signal is outputted over a further plurality of parallel connections between the interface device and the further interface device, the further plurality of parallel connection is comprised in the digital parallel bus and the reference is digital, and corresponds to the selection part of the control signal in case the selection part is received over low voltage connections only.

As the reference corresponds to low voltage connections for the selection part of the control signal, the method provides both compatibility with an upstream print engine arranged to fully command the station via the addressing part of the control signal using both high hand low voltage connections, as well as "backward" compatibility with an upstream print engine in the sheet processing line upstream of the station, that is not arranged to command the station, via the parallel connections for the addressing part of the control signal, and not raising the voltage for these parallel connections.

As print engines that are not arranged to command the station via the parallel connections for the addressing part of the control signal do not use these parallel connections, it is common practice that they will not raise the voltage on these lines.

According to a further embodiment of the method, the interface device interprets a low voltage as a bit value of zero, and a high voltage as a bit value of one, the addressing part of the control signal is received over two parallel connections of the plurality of parallel connections. Wherein addressing part comprises a first bit value and a second bit value, the selection part of the control signal is received over a first parallel connection of the plurality of parallel connections, and comprises the first bit value, the further addressing part of the further control signal is outputted over two further parallel connections of the further plurality of parallel connections, and comprises a further selection part of the further communication. The further selection part of the further control signal is outputted over a further single parallel connection of the further plurality of parallel connections, and comprises a further first bit value. Wherein arranging that a further addressing part of the further control signal differs from the addressing part of the control signal comprises determining the further first bit value by performing a multiplication of the first bit value, and the second bit value, and setting the further second bit value to zero.

Because the reference corresponds to a low voltage, which corresponds to a bit value of zero, the comparison result is positive in case the first bit value is 0. In the other cases, the further interface device will receive a selection part of the control signal with a bit value 1 or 0. This provides compatibility to the further interface device in case that further interface device is the same type as the interface device in case a bit value of 1 is received. It also provides compatibility to the further interface device of the same type as the interface device as well as an interface device of a type wherein the selection part of the control signal is not used in case the bit value is 0. Thus compatibility with both types for interface devices is achieved in case no more than two interface devices are used to receive a signal from an upstream station.

According to a further embodiment of the method, the digital parallel bus is compatible with a DFD2-bus, where the instruction part corresponds to a command signal that is received over a first set of parallel connections, and the further instruction part is determined by multiplying the bit values of each parallel connection in the first set of parallel connections with the first bit value.

As plurality of parallel connections, and the further plurality of digital connections, connects different devices in a digital parallel bus, each parallel connection in the plurality of parallel connections has a corresponding further parallel connection.

Moreover, because of the bus structure, since the instruction part corresponds to a command signal, the further instruction part corresponds to a command signal.

When the comparison result is positive, the first bit value is 0, and an instruction signal is sent from the interface device to the processing unit, where the further instruction part is formed by 0-es as bit value.

As the digital parallel bus is compatible with the DFD2-bus, so is the further digital parallel bus.

When the further instruction part is formed by zeroes, any downstream station will be put in a power save mode, which obviously saves energy, in case the interface device sends an instruction signal to the processing unit, which means that that processing unit will execute a finishing job.

According to a further aspect of the present invention, there is provided a computer program product adapted to perform any of the embodiments of the method according to the present invention.

According to a further aspect of the present invention, there is provided a record carrier comprising the computer program product adapted to perform any of the embodiments of the method according to the present invention.

According to an aspect of the present invention, there is provided a server comprising a record carrier comprising the computer program product adapted to perform any of the embodiments of the method according to the present invention, and configured for enabling downloading the computer program product.

According to an aspect of the present invention, there is provided an interface device for interfacing to a processing unit, wherein the interface device and the processing unit are arranged to be comprised in a station of a plurality of stations in a sheet processing line. The interface device is arranged to receive a control signal from an upstream station, wherein a signal processing apparatus comprises a comparator arranged for determining a comparison result by comparing a selection part of the control signal with a reference. The selection part is comprised in an addressing part of the control signal, the signal processing apparatus further comprises a determination circuit connected to the comparator for, in case of a negative comparison result, determining a further control signal from the control signal, where the at least a further addressing part of the further control signal is derived from, and differing from the addressing part of the control signal. The interface device outputs the further control signal to a further interface device corresponding to a further processing unit of a downstream station. A sending circuit connected to an output port and to the comparator is arranged to send an instruction signal from the interface device to the processing unit, in case of a positive comparison result.

According to an embodiment of the present invention, there is provided a finisher for a sheet processing line comprising any embodiment of an interface device according to present invention.

It will be understood that the processing unit does not have to be the first processing unit in the line downstream of a print engine. It is possible that the processing unit is preceded by another processing unit that is also equipped with an interface device according to the invention, such that it provides the control signal for the processing unit.

BRIEF DESCRIPTIONS OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
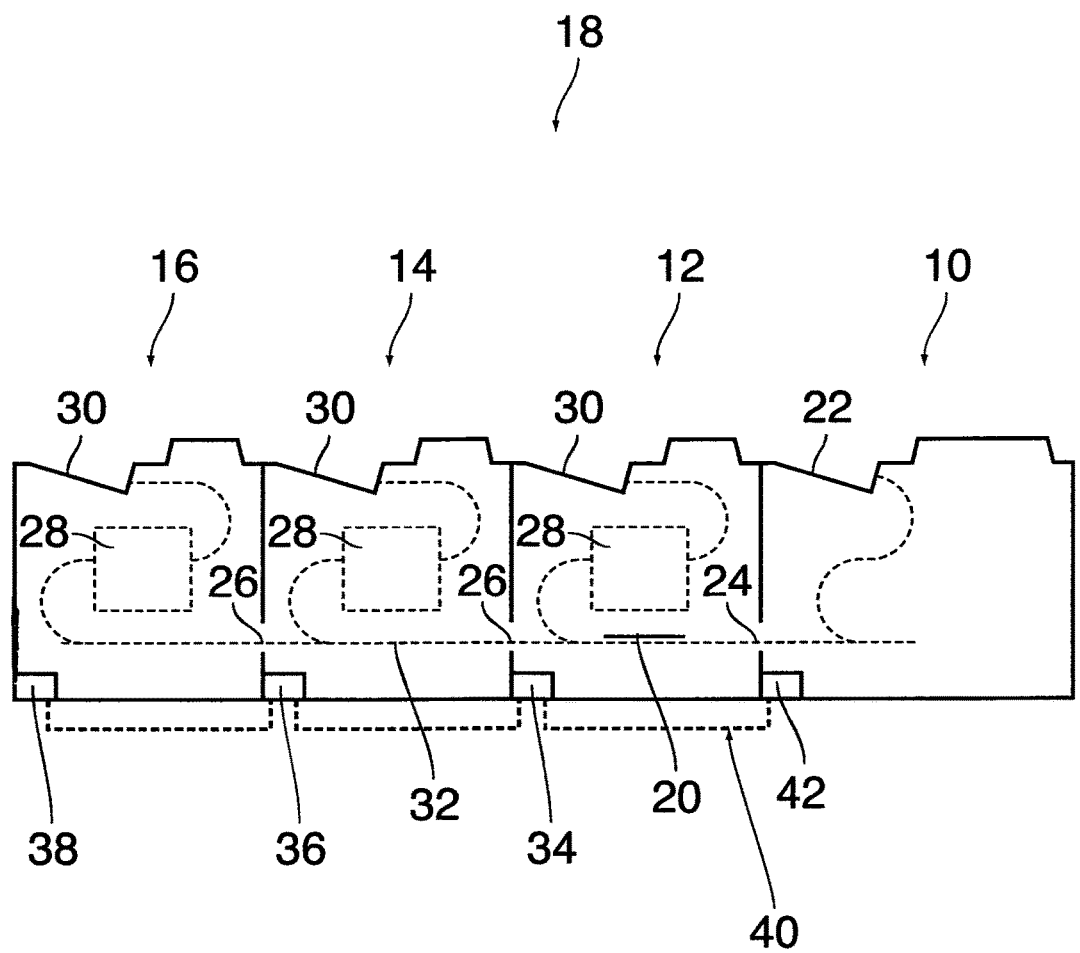
FIG. 1 is a schematic view of a printing system comprising two finishers equipped with interface devices according to the present invention and a third finisher.

In an embodiment of the present invention, a sheet processing line (18) comprises a printer (10), a first finisher (12), a second finisher (14) and a third finisher (16). The first finisher is a first station, the second finisher is a second station unit, and a third finisher is a third station, as illustrated in FIG. 1. The printer (10), the first finisher (10), the second finisher (14), and the third finisher (16) form a plurality of stations.

The printer (10) comprises a print engine arranged to print images onto sheets (20), and to direct the printed sheets either to a local output tray (22), or to a port (24), depending upon job specifications of a print job executed by the printer (10).

The first finisher (12) is arranged to receive the sheets (20) via the port (24) from the printer (10), and either to forward them to a port (26) without performing any finishing operation, or to perform a finishing operation in a processing unit (28) and then to discharge the finished sheets onto an output tray (30). In other words, the printer (10) is placed upstream of the first finisher (12), which in turn is upstream of the second finisher (14), which in turn is upstream of the third finisher (16). The first finisher comprises a first conveyor mechanism to transport the sheets (20) from the port (24) shared with the printer (10) to the port (26) shared with the second finisher (14).

In the example shown, the second finisher (14) and third finisher (16) have the same general constitution as the first finisher (12). The processing unit (28) of the second finisher (14) is designed for the same finishing task as the processing unit (28) of the first finisher (12), and the processing unit of the third finisher (16) is designed for another finishing task. Each of the finishers (12, 14, 16) has a sheet receiving port (24, 26), which matches with the port (24) of the printer, or as the case may be, the port (26) of the preceding finisher, so as to constitute a continuous sheet conveying path (32) comprising the conveyor mechanisms of the first, second and third finishers (12, 14, 16). When running, the conveyor mechanisms of the first, second and third finishers (12, 14, 16) each run at the same speed for conveying the sheets (20) at the same speed. The third finisher (16) is the last processing unit in the line, and does not support feeding sheets to a station downstream of the third finisher (16).

The first finisher (12) comprises a first interface device (34) designed in accordance with the principles of the present invention. The second finisher (14) comprises a second interface device (36) and third finisher (16) comprises a third interface device (38). The second interface device (36) has the same design as the first interface device (34). The third interface device (38) differs in that it is not designed for use with stations downstream of the station in which the third interface device (38) is used.

Figure 2:
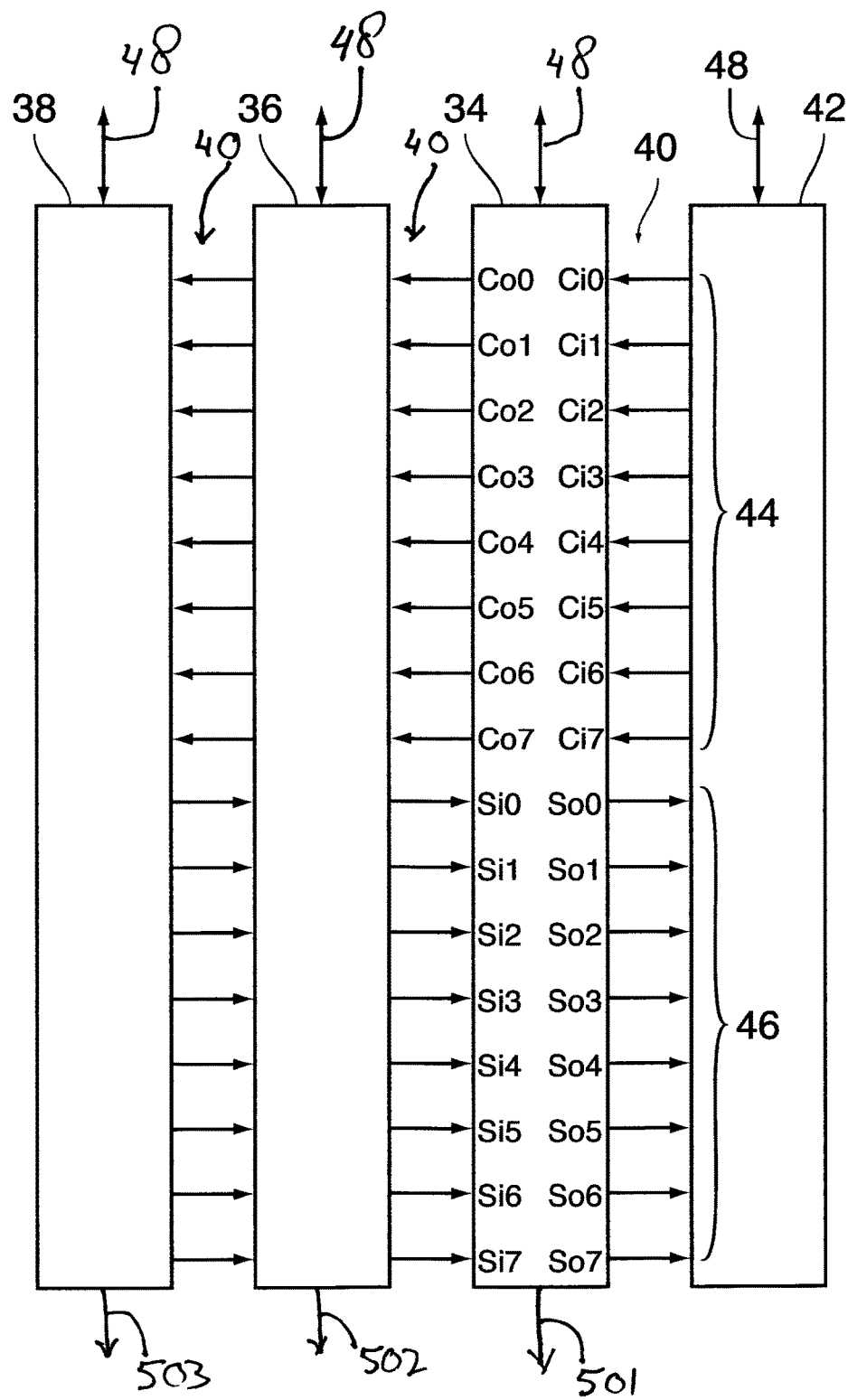
FIG. 2 illustrates a bus system interconnecting the interface devices shown in FIG. 1.

A digital parallel bus (40) connects the first interface device (34) of the first finisher (12) with a source interface device (42) of the printer (10), and with the interface device (36) of the second finisher (14). The digital parallel bus (40) also connects the second interface device (36) with the third interface device (38). This is shown in FIG. 2.

The digital parallel bus (40) is compatible with a DFD2-bus. The first interface device (34) interfaces the digital parallel bus (40) to the processing unit (28) of the first finisher (12). Similarly, the second interface device (36) interfaces the digital parallel bus (40) to the processing unit (28) of the second finisher (14). Similarly, the third interface device (38) interfaces the digital parallel bus (40) to the processing unit (28) of the third finisher (16).

The digital parallel bus (40) comprises an 8-bit control signal line (44) for transmitting control signals in a downstream direction from the source interface device (42) of the printer (10) towards the third interface device (38). The digital parallel bus (40) also comprises another 8-bit line, a status signal line (46), for transmitting status signals in upstream direction to the source interface device (42) of the printer (10). The 8-bit control signal line (44) comprises 8 separate connections between the source interface device (42) and the first interface device (34), 8 separate connections between the first interface device (34) and the second interface device (36), and so on. The 8-bit status signal line (46) comprises 8 separate connections between the source interface device (42) and the first interface device (34), 8 separate connections between the first interface device (34) and the second interface device (36), and so on. The connections in the control signal line (44) are separate from the connections in the status signal line (46).

The first, second and third interface devices (34, 36, 38) and the source interface device (42) all are designed such that a low voltage on a connection in the bus corresponds to a 0 as bit value, and that a high voltage on a connection in the bus corresponds to a 1 as bit value. A low voltage corresponds to inactive. To attain a high voltage, an electrical component needs to be activated.

Further, each interface device (34, 36, 38) has an input/output port (48) for sending instruction signals to the processing unit (28) in the related finisher (12, 14, 16), and for receiving status information from the processing unit (28). In case of sending the instruction signals, the input/output port functions as an output port (48), in case of receiving status information, the port functions as an input port (48). Similarly, the source interface device (42) comprises an input/output port (48) for sending instruction signals and receiving control information to and from the print engine in the printer (10). Further, each interface device (34, 36, 38) has a conveyor signal port (501, 502, 503) for sending conveying instruction signals to the conveyor mechanism in the related finisher (12, 14, 16).

The first interface device (34) receives a control signal comprising a number of control signal items (Ci0-Ci7) from the source interface device (42), and as the case may be, sends a further control signal comprising a further number of further control signal items (Co0-Co7) to the second interface device (36) comprised in the second finisher. The control signal items are each received over a unique connection (440-447) in the control signal line (44). Similarly, the further control signal items (Co0-Co7) are each sent over a unique connection in the control signal line (44).

For example, the control signal items (Ci0-Ci4 and Ci7) may convey information that informs the first finisher (12) when another sheet (20) is exiting the printer at the port (24), when a set of sheets (to be subjected to a finishing operation such as stapling or binding) has been completed, when a print job has been completed, and the like. At reception of the control signal by the first interface device (34), a conveyor instruction signal is send by the first interface device (34) to the conveyor mechanism based on at least one of the control signal items to arrange that the conveyor mechanism is running.

If the information is passed on, the information is passed-on to the second interface device (36) and the third interface device (38) without any alteration (Co0=Ci0, Co1=Ci1, etc.). Herein, control signal items that are received by an interface device are marked in that context with a small "i," control signal items that are outputted by the interface device are marked in that context with a small "o." Corresponding control signal items are marked by the same number.

The fifth and sixth bit on the control signal line (44), i.e. the control signal items Ci5 and Ci6, constitute an addressing part of the control signal specifying which of the three finishers (12, 14, 16) has been addressed for performing the finishing task.

Herein the bit value of the control signal item Ci5 corresponds to a first bit value, the bit value of the control signal item Ci6 corresponds to a second bit value.

The first interface device (34) converts this addressing part of the control signal into a further addressing part of a further control signal, and is used for forwarding control information to the second interface device (36), as will be explained in detail in conjunction with FIGS. 3 to 5.

The addressing part is received over two parallel connections (445, 446) in the control signal line (44). One of the two parallel connections, here the first parallel connection (445), is used to receive the selection part of the control signal (Ci5). An instruction part of the control signal is received over a first set (440-444, 447) of parallel connections formed by the other 6 parallel connections in the control signal line (44). This is independent of the interface device (34, 36, 38, 42) connected to the parallel digital bus (40).

1. First Example

Figure 3:
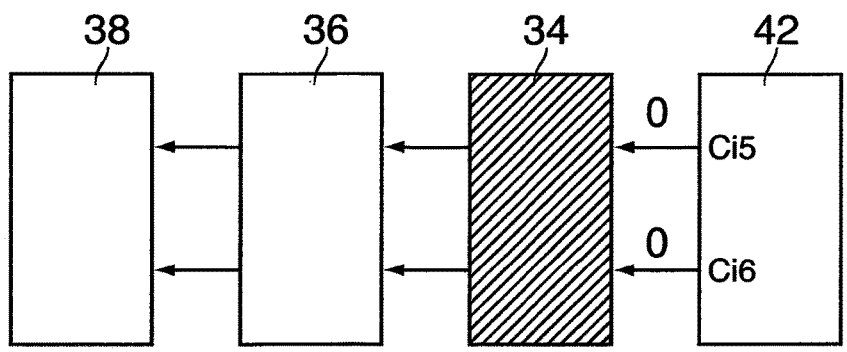
FIGS. 3 to 5 illustrate three different modes of operation of the finishers and interface devices shown in FIG. 1.

In a first example, embodied in FIG. 3, the first finisher (12) has been addressed for the finishing task. This is illustrated in FIG. 3 by hatching the box that symbolizes the first interface device (34). FIG. 3 shows only those parts of the interface devices (34-38 and 42) that deal with the addressing part (Ci5, Ci6) of the control signal, and the further addressing part (Co5, Co6) of the further control signal.

The control signal items (Ci0-Ci7) are each received over a separate connection from the source interface device (42), the separate connections is comprised in a plurality of parallel connections comprised in the control signal line (44).

For processing the control signal, the first interface device (34) comprises signal processing apparatus (62, 63, 64).

In this case, the control signal items Ci5 Ci6 in the addressing part both have a bit value of 0. The control signal item Ci5 forms a selection part of the control signal. The signal processing apparatus of the first interface device (34) comprises a comparator (62). The comparator (62) is used to determine a comparison result by comparing the selection part with a reference using a comparator (62). The reference has a bit value of 0 which corresponds to a low voltage on the digital parallel bus.

As the value of Ci5=0, the comparison result is positive, corresponding to the first finisher (12) having been selected.

The signal processing apparatus of the interface device (34) also comprises a sending circuit (64). The sending circuit (64) is connected to the comparator (62) and to the output port (48). Based on the comparison result, the sending circuit (64) sends an instruction signal to the processing unit (28) of the first finisher (12) by forwarding an instruction part of the control signal formed by the control signal items Ci0-Ci4 and Ci7 via the output port (48). As the instruction signal is formed by forwarding the instruction part, the instruction signal is based on the instruction part, and is copied from the instruction part.

The instruction part of the control signal is received over first set of parallel connections (440-444,447) comprised in the control signal line (44). Since the downstream finishers, i.e. the second finisher (14) and the third finisher (16), are not addressed, no control signals need to be forwarded to the second interface device (36), and any status information from the second interface device (36) may be ignored by the first interface device (34).

In this example, the second interface device and the third interface device do not receive a control signal. Therefore, in the second finisher (14) and the third finisher (16), no conveyor instruction signal is sent by the respective interface devices to the respective conveyor mechanism to arrange that it is running.

2. Second Example

Figure 4:
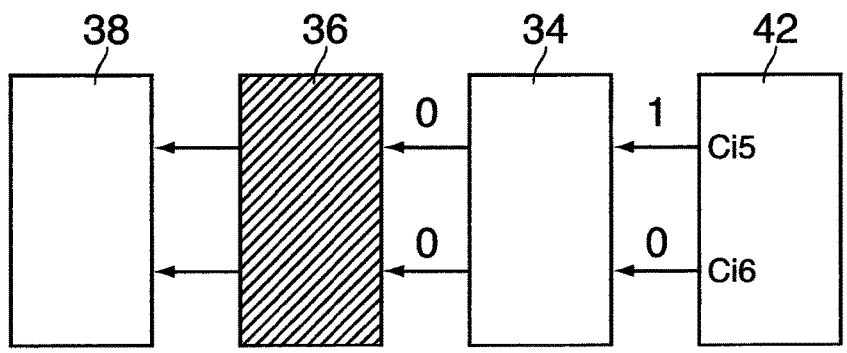

In a second example, embodied in FIG. 4, the second finisher (14) has been selected by the printer (10). The control signal is received over the control signal line (44) between the source interface device (42) comprised in the printer (10), and the first interface device (34) comprised in the first finisher (12). This is indicated by the bit combination Ci5=1 and Ci6=0 on the input side of the first interface device (34). As indicated, the control signal item Ci5 forms the selection part of the control signal. Again, a comparison result is determined by comparing the selection part with the reference.

As the value if Ci5=1, the comparison result is negative, corresponding to the first finisher (12) not having is selected. The negative comparison result translates in the digital domain in a bit value of zero. The bit value of the comparison result is used to determine that no instruction signal is forwarded to the processing unit (28) of the first finisher (12).

The signal processing apparatus of the first interface device (34) comprises a determination circuit (63) connected to the comparator (62). The determination circuit (63) comprises contacts for making contact to each connection to the source interface device (42) in the control signal line (44). The determination circuit (63) also comprises contacts for making contact to each connection to the second interface device (36) in the control signal line (44). The further addressing part of the further control signal is determined from the addressing part of the control signal.

As indicated, the bit value of the control signal item Ci5 corresponds to a first bit value, the bit value of the control signal item Ci6 corresponds to a second bit value. To determine the further addressing part, the further selection part (Co5) is determined by multiplying the first bit value and the second bit value. In this case as 1 times zero is zero, that means that Co5 receives the bit value 0. In addition, the bit value of the other further control signal item (Co6) in the further addressing part, i.e. the further second bit value, is set to 0, as that corresponds to the reference.

A further instruction part of the further control signal is formed by a copy of the instruction part of the control signal, and hence is based on the instruction part. The further addressing part is determined from the further addressing part, and the further instruction part is copied from the instruction part, the further control signal is determined from the control signal.

The further addressing part is outputted over two of the plurality of parallel connections in the control signal line (44), and the further instruction part is outputted over 6 different connections of the control signal line (44). As explained earlier the control signal line (44) and the status signal line (46) are each formed by 8 separate connections making up 16 separate connections. The further control signal items (Co0-C07) are each sent over a separate connection from the first interface device (34), the separate connections is comprised in a plurality of parallel connections comprised in the control signal line (44).

At reception of the control signal by the first interface device (34), a conveyor instruction signal is sent by the first interface device (34) to the conveyor mechanism based on at least one of the control signal items, in order to arrange that the conveyor mechanism is running.

As a result, in this second example the first interface unit (34) produces at its output a further control signal having a further addressing part with the same bit pattern as on the input side in the first example. Consequently, as the second interface device (36) functions in the same way as the first interface device (34), it will control the second finisher (14) according to the first finisher in the first example explained, and will not forward any control signals to the third interface device (38).

3. Third Example

Figure 5:
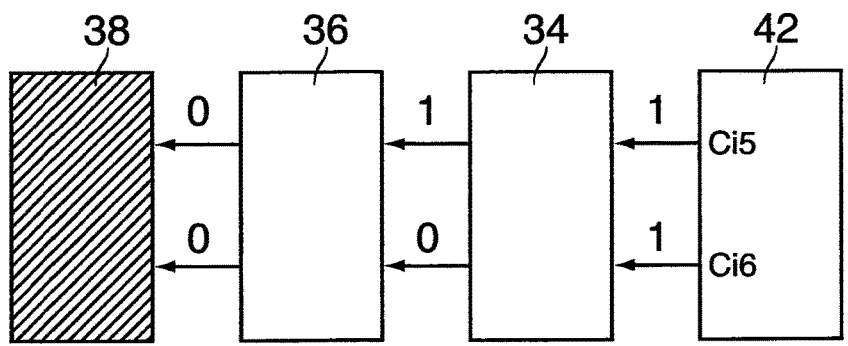
Figure 6:
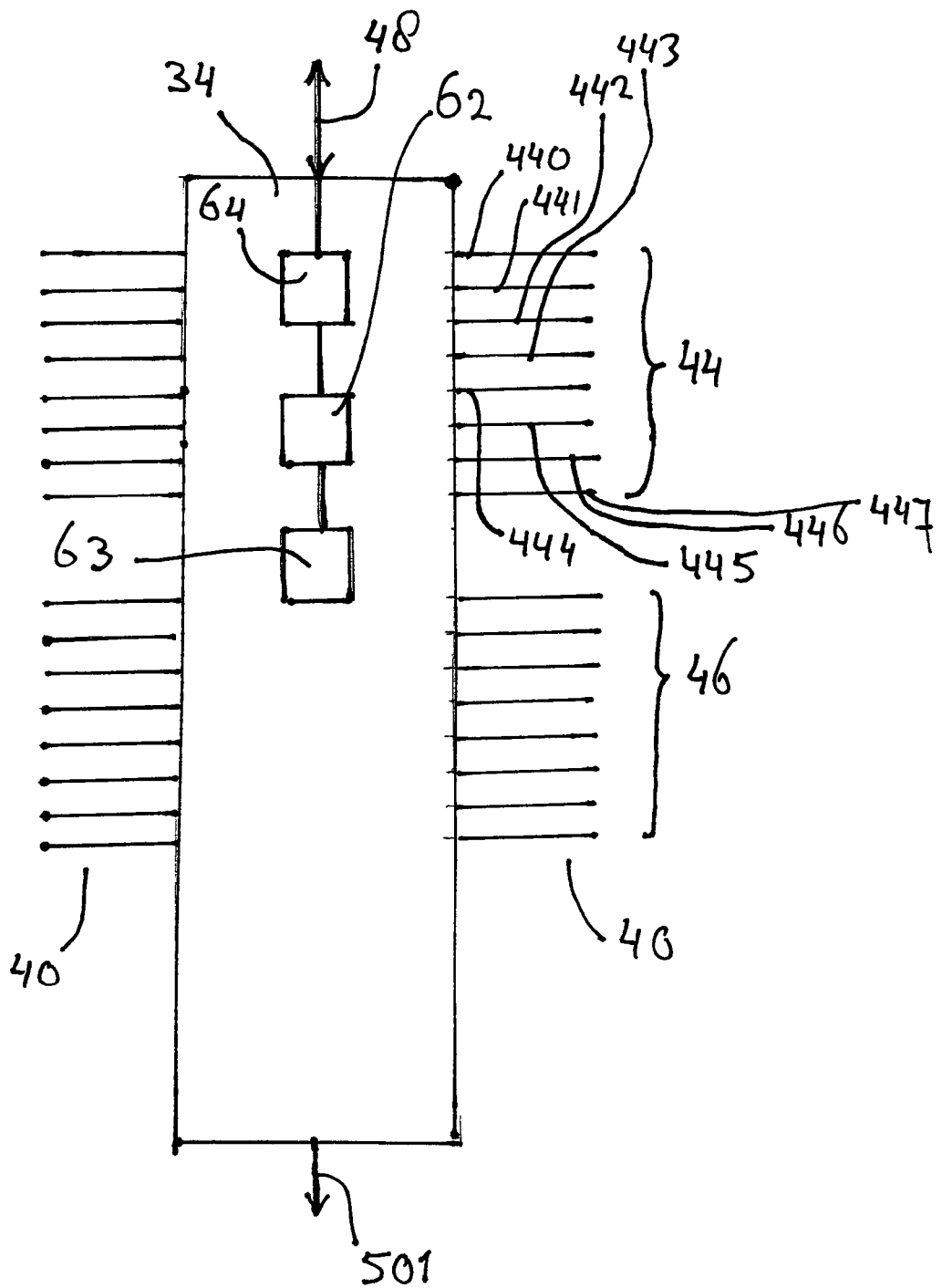
FIG. 6 illustrates a schematic view of an interface device according to the present invention

In the third example, embodied in FIG. 5, a third finisher (16), i.e. the last or most downstream finisher in the sheet processing line (18), has been selected. This is indicated by the bit configuration Ci5=1 and Ci6=1 on the input side of the first interface device (34).

In the first interface device (34) the comparison result is negative as the bit value of Ci5, which is 1, differs from the bit value of the reference, which is 0.

Like in the second example illustrated in FIG. 4, the first interface device does not forward an instruction signal to the processing unit (28) of the first finisher (12) because of the negative comparison result. However, a conveyor instruction signal is sent to the conveyor mechanism of the first finisher (12) to transport sheets (20) from the port (24) shared with the printer (10) to the port (26) shared with the second finisher (14).

A further addressing part is determined using the same method for the first interface device, as in the example explained using FIG. 4. Thus, the further selection part (Co5) is determined by multiplying the first bit value and the second bit value. The bit value of the other further control signal item (Co6) in the further addressing part, i.e. the further second bit value, is set to zero, as that corresponds to the reference.

A further instruction part of the further control signal is formed by a copy of the instruction part of the control signal. The further addressing part is determined from the further addressing part, and the further instruction part is copied from the instruction part, the further control signal is determined from the control signal.

Consequently, the first interface device (34) produces at its output the same bit configuration (1, 0) as the first interface device (34) receives on the input side in FIG. 4. Thereupon, the interface device of the station downstream of the first finisher (12), i.e. the second finisher (14), i.e. the second interface device (36), behaves in the same manner as the first interface device (34) in FIG. 4, with the result that the control signal is forwarded to the third interface device (38), and Ci5=0. As another result, the second interface device (36) sends a conveyor instruction signal to the conveyor mechanism of the second finisher (14) to arrange that the second finisher (14) transports sheets from the port (26) that the second finisher (14) shares with the first finisher (12) to the port (28) that the second finisher (14) shares with the third finisher (16).

The third interface device (38) differs from the first interface device (34), in that it does not determine a comparison result, and ignores the information of the fifth and sixth bit of the control signal (Ci5,Ci6) that it receives from the second interface device (36) over the parallel digital bus (40). Upon reception of the control signal from the second interface device (36), it sends a conveyor instruction signal to the conveyor mechanism of the third finisher (16) to arrange that it transports sheets (20) from the port (26) that the third finisher (16) shares with the second finisher (14), to the processing unit (28) of the third finisher (16). It also sends an instruction signal to the processing unit (28) based on the instruction part of the control signal.

In this embodiment, command signals from an upstream station (10) are forwarded to a downstream station (14) via the first interface device (34) and the digital parallel bus (40) without any substantial delay. It has to be taken into account then that command signal items that synchronize with paper sheet entrance have to be delayed with respect to a further addressing part (Co5, Co6) of the further control signal. For example, it is desired that control signal item Ci0, is a sheet trigger signal that informs the finisher that a sheet is entering the finisher in order for the finisher to initialize the finishing operation on the sheet, and control signal Ci1, is an end of set signal indicating the current sheet is the last one of a set, arrive at the same time at the second finisher (14) as the arrival of the sheet of concern. Theretofore, when e.g. addressing the third finisher as target, these control signal items will be delayed to assure that they will arrive simultaneously with the sheet. Heretofore, the printer disposes of a table with feed-through times for each finisher, so that the delay for these signals can be calculated, and uses the table to time the commands sent over the parallel digital bus (40) by the source interface device (42).

On the status signal line (46), the first interface device (34) receives status signals Si0-Si7 conveying status information on the condition of the second finisher (14) and the third finisher (16). This information may for example comprise information that the second or third finisher is online, an error signal, overflow of a storage bin in the finisher, delivery of a sheet, paper jam in the finisher, and the like. The status signal items are each received over a unique connection in the status signal line (46). The status signal items (Co0-Co7) are each sent over a unique connection in the status signal line (46).

Via its input/output port (48), the first interface device (34) also receives the corresponding items of status information on the first finisher (12). This information on the status of the first finisher (12) is combined with the information of the status signal items Si0-Si7 using a logic OR-function. Consequently, the status information that is transmitted to the interface device (42) of the print engine comprises the relevant status information of all finishers. Of course, when the first finisher (12) has been selected for the finishing task, the second finisher (14) and the third finisher (16) are not operating, and will not provide any status signals. In that situation, the signal on the output lines So0-So7 reflects only the status of the first finisher (12). On the other hand, when, for example, the third finisher (16), which is the most downstream finisher, has been selected for the finishing task, and a paper jam occurs in any of the three finishers, the bit that indicates the paper jam will be "1", regardless in which of the finishers the jam has occurred.

In a variant, to prevent erroneous signals in case of a malfunction of one of the downstream interface devices, the status signal items (Si0-Si7) are multiplied by the comparison result. The result of the multiplication is combined with the information on the status of the first finisher (12) using a logic OR-function.

In these three examples, the logical operation that is performed in the first interface device (34) for transforming Ci5, Ci6 into Co5, Co6 may be described as a multiplication of the first bit value (the bit value of the selection part (Ci5)) and the second bit value (i.e. the bit value of the other control signal item (Ci6) in the addressing part) and setting the further second bit value to zero or the reference. This is done by a determination circuit (63) that may comprise a microprocessor.

In a variant, the logical operation that is performed in the determination mechanism (63) of the first interface device, is described as Co5=Ci6 and Co6=0 as 0, is the bit value of the reference. A shifter or shift register can be used for this. In any case, the output of the shift register differs from the input, as the printer will not send a control signal with the first bit value and the second bit value is 0.

In the second example this variant means the following in the first interface device (34). The bit value of the other control signal item (Ci6) in the addressing part, which was received over a second parallel connection (446), is shifted to form the further selection part (Co5) and thus is given the value 0. The other further control signal item (Co6) in the addressing part is given the value of the reference, here 0 by shifting in the reference.

In the third example this variant means the following in the first interface device (34). To determine the further addressing part, the further selection part (Co5) is determined using a shift register in a determination circuit (63). The bit value of the other control signal item (Ci6) of the addressing part, which was received over a second parallel connection (446), is shifted to form the further selection part (Co5). As Ci6=1, this means that C05=1. The other further control signal item (Co6) in the addressing part is given the value of the reference, here 0 by shifting in the reference.

While only three finishers have been concatenated in the first, second and third example described above for the original variant, it is easily possible to extend the concept to a line with four finishers. The two bits constituting the input target signal can be used for encoding, so that each of the four finishers can be designated as the target finisher by encoding a number (0, 1, 2, 3), and the interface device can be arranged to subtract the value of one for determining the further addressing part. Of course, when more than two bits are available for the input and output target signals, the concept may be extended to a processing line with even more finishers.

Some or all aspects of the present invention may be implemented in a computer program product, i.e. a collection of computer program instructions stored on a non-transitory computer readable medium, including a storage device, for execution by a computer. The instructions of the present invention may be in any interpretable or executable code mechanism, including but not limited to scripts, interpretable programs, dynamic link libraries (DLLs) or Java classes. The instructions can be provided as complete executable programs, as modifications to existing programs or extensions ("plugins") for existing programs. Moreover, parts of the processing of the present invention may be distributed over multiple computers or processors for better performance, reliability, and/or cost.

Storage devices suitable for storing computer program instructions include all forms of non-volatile memory, including by way of example semiconductor memory devices, such EPROM, EEPROM, and flash memory devices, magnetic disks such as internal and external hard disk drives and removable disks, magneto-optical disks and CR-ROM disks. The computer program product can be distributed on such a storage device, or may be offered for download through http, FTP or similar mechanism using a server connected to a network such as the internet. Transmission of the computer program product by email is course also possible.

What is claimed is:

1. A method of using an interface device to interface to a processing unit, the interface device and the processing unit being comprised in a station of a plurality of stations in a sheet processing line, the method comprising the steps of:
using the interface device to receive a control signal from an upstream station;
determining a comparison result by comparing a selection part of the control signal with a reference, the selection part being comprised in an addressing part of the control signal,
wherein in case of a negative comparison result, the method further comprises the steps of:
determining a further control signal from the control signal, and deriving at least a further addressing part of the further control signal, wherein the further addressing part differs from the addressing part of the control signal; and
using the interface device to output the further control signal to a further interface device corresponding to a further processing unit of a downstream station,
wherein in case of a positive comparison result, the method further comprises the step of:
sending an instruction signal from the interface device to the processing unit, the instruction signal being formed by an instruction part of the control signal, the instruction part of the control signal and the addressing part of the control signal being received over separate connections; and
determining a further control signal,
wherein the step of determining a further control signal comprises the steps of:
producing the further addressing part of the further control signal that differs from the addressing part of the control signal; and
producing a further instruction part of the further control signal based on the instruction part of the control signal,
wherein the further instruction part and the further addressing part of the further control signal are outputted over separate connections,
wherein the control signal is received over a digital parallel bus, wherein the digital parallel bus comprises a plurality of parallel connections between the upstream station and the station,
wherein the further control signal is outputted over a further plurality of parallel connections between the interface device and the further interface device, the further plurality of parallel connections being comprised in the digital parallel bus,
wherein the reference is digital and corresponds to the selection part of the control signal in case the selection part is received over low voltage connections only,
wherein the interface device interprets a low voltage as a bit value of zero and a high voltage as a bit value of one,
wherein the addressing part of the control signal is received over two parallel connections of the plurality of parallel connections and comprises a first bit value and a second bit value,
wherein the selection part of the control signal is received over a first parallel connection of the plurality of parallel connections and comprises the first bit value,
wherein the further addressing part of the further control signal is outputted over two further parallel connections of the further plurality of parallel connections and comprises a further selection part of the further communication,
wherein the further selection part of the further control signal is outputted over a further single parallel connection of the further plurality of parallel connections and comprises a further first bit value, and
wherein the method further comprising the step of arranging the further addressing part of the further control signal by determining the further first bit value by performing a multiplication of the first bit value and the second bit value and setting a further second bit value to zero.

2. The method according to claim 1, wherein the digital parallel bus is compatible with a DFD2-bus,
wherein the instruction part corresponds to a command signal that is received over a first set of parallel connections, and
wherein the further instruction part is determined by multiplying the bit values of each parallel connection in the first set of parallel connections with the first bit value.

3. A computer program product embodied on a non-transitory computer readable medium and configured to perform the method of claim 1.

4. A record carrier constituting a non-transitory computer readable medium comprising the computer program product of claim 3.

5. A server comprising the record carrier according to claim 4.

6. An interface device for interfacing to a processing unit, wherein the interface device and the processing unit are arranged in a station of a plurality of stations in a sheet processing line, and wherein the interface device is arranged to receive a control signal from an upstream station, the interface device further comprising:
a comparator configured to determine a comparison result by comparing a selection part of the control signal with a reference, the selection part being comprised in an addressing part of the control signal;
a determination circuit connected to the comparator, said determination circuit, in case of a negative comparison result, being configured to:
determine a further control signal from the control signal;
derive at least a further addressing part of the further control signal from the addressing part of the control signal, where the further addressing part is different than the addressing part; and
use the interface device to output the further control signal to a further interface device corresponding to a further processing unit of a downstream station; and
a sending circuit connected to an output port and to the comparator and configured to:
send an instruction signal from the interface device to the processing unit, in case of a positive comparison result, the instruction signal formed by an instruction part of the control signal, the instruction part of the control signal and the addressing part of the control signal being received over separate connections; and
determine a further control signal,
wherein the sending unit is configured to determine the further control signal by:

producing the further addressing part of the further control signal; and producing a further instruction part of the further control signal based on the instruction part of the control signal, wherein the further instruction part and the further addressing part of the further control signal are outputted over separate connections, wherein the control signal is received over a digital parallel bus, wherein the digital parallel bus comprises a plurality of parallel connections between the upstream station and the station, wherein the further control signal is outputted over a further plurality of parallel connections between the interface device and the further interface device, the further plurality of parallel connections being comprised in the digital parallel bus, wherein the reference is digital and corresponds to the selection part of the control signal in case the selection part is received over low voltage connections only, wherein the interface device interprets a low voltage as a bit value of zero and a high voltage as a bit value of one, wherein the addressing part of the control signal is received over two parallel connections of the plurality of parallel connections and comprises a first bit value and a second bit value, wherein the selection part of the control signal is received over a first parallel connection of the plurality of parallel connections and comprises the first bit value, wherein the further addressing part of the further control signal is outputted over two further parallel connections of the further plurality of parallel connections and comprises a further selection part of the further communication, wherein the further selection part of the further control signal is outputted over a further single parallel connection of the further plurality of parallel connections and comprises a further first bit value, and wherein the further addressing part of the further control signal is arranged, which differs from the addressing part of the control signal, by determining, via the determination circuit, the further first bit value by performing a multiplication of the first bit value and a second bit value and setting a further second bit value to zero.

7. The interface device according to claim 6, arranged to perform the method of claim 1.

8. A finisher for a sheet processing line comprising the interface device according to claim 6.

* * * * *